(12) United States Patent
Kawate et al.

(10) Patent No.: US 6,753,379 B1
(45) Date of Patent: Jun. 22, 2004

(54) HEAT ACTIVATED ADHESIVE

(75) Inventors: Kohichiro Kawate, Machida (JP);
Yorinobo Takamatsu, Sagamihara (JP);
Hitoshi Yamaguchi, Sagamihara (JP);
Akito Muramatsu, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/111,113

(22) PCT Filed: Nov. 5, 1999

(86) PCT No.: PCT/US99/26195
§ 371 (c)(1),
(2), (4) Date: Apr. 19, 2002

(87) PCT Pub. No.: WO01/34716
PCT Pub. Date: May 17, 2001

(51) Int. Cl.$^7$ ............................ C08L 25/18; C08L 33/14
(52) U.S. Cl. ...................... 525/176; 525/186; 525/190
(58) Field of Search ................................ 525/186, 190, 525/176

(56) References Cited

U.S. PATENT DOCUMENTS

| 3,576,778 A | 4/1971 | Davis |
| 5,192,612 A | 3/1993 | Otter et al. |
| 5,883,193 A | 3/1999 | Karim |

FOREIGN PATENT DOCUMENTS

| JP | 4-309583 | 11/1992 |
| JP | 5-339556 | 12/1993 |
| JP | 6-256746 | 9/1994 |
| JP | 8-134428 | 5/1996 |
| JP | 2000-119624 | 4/2000 |
| WO | WO 81/00718 | 3/1981 |
| WO | WO 97/46633 | 12/1997 |

*Primary Examiner*—Patricia A. Short
(74) *Attorney, Agent, or Firm*—Scott A. Bardell

(57) ABSTRACT

The present invention provides thermally activated adhesive compositions comprising polymer and polyester wherein the adhesive polymer comprises a polymer having hydroxyl and phenyl groups and adhesive films made from the adhesive compositions.

3 Claims, No Drawings

HEAT ACTIVATED ADHESIVE

The present invention relates to thermally activated adhesive compositions that form adhesive films wherein the surface practically does not have adhesive properties and adhesive films made from said adhesive compositions.

Adhesives that have as their main component an adhesive polymer, also called pressure sensitive adhesive (adhesive agent), and it is a material where only by the application of pressure it is easily and strongly adhered. However, because of the fact that it has adhesive properties, the processing properties for punching processing etc., are poor and also the positioning is difficult.

Then, there have been numerous technologies for the control of the adhesive properties of the adhesive films (that have a binding layer that is formed from an adhesive agent). For example, there is the method where onto the adhesive surface, by using an embossing technological process indentations and protrusions are provided and the apparent adhesive properties are reduced, and then by heating these are smoothed out and flattened and by that the adhesive force is increased (disclosed according to the reported in the Japanese Patent Application Laid Open Number Hei-Sei 4-309583). Namely, it is a method where at the time of the processing and positioning, the state of protrusions and indentations of the adhesive surface, that has a low adhesive force relative to the material that is the subject of the adhesion, is maintained, and at the state where the adhesion is to be completed, the adhesive surface is smoothed out and flattened and the adhesive force is increased.

Also, as an adhesive film that has an adhesive layer containing a crystalline component, there is a material that has been disclosed according to the reported in PCT Publication WO 97/46633. By the adhesive layer of this adhesive film inside the adhesive polymer material a crystalline acrylate component is incorporated as a continuous phase. Also, by this adhesive layer, it is relatively difficult to lose the adhesive force and to completely lose the adhesive properties and usually, the binding surface (the adhesive surface) has adhesive properties. Consequently, properties of memory of its shape are generated and the adhesive surface that has protrusions and indentations as the secondary shape, is changed to the smooth adhesive surface which is the memory shape state (the primary state), and by that the same way as in the above described the easiness of the processing properties and the positioning properties, is increased.

However, in the case of such adhesive films, after the stage of the processing and the positioning (initial stages) it is not possible to form a smooth binding surface possessing film adhesive. In the case when the binding surface has adhesive properties and not only that but also it has a structure containing protrusions and indentations, the elimination of the impurities that are adhered at the time of the processing and positioning, is difficult. Also, in order to reliably sustain such binding surface with protrusions and indentations, it is necessary to have a specific liner (a material where the release surface also has a structure containing protrusions and indentations, etc.), and the economics are also complicated. Also, the Tg of the adhesive polymer material itself is relatively low, and the thermal resistance properties are also low.

On the other hand, adhesives are also known where adhesive properties are generated or increased by heating, and they are so-called thermally activated adhesive. In the case of the thermally activated adhesive, it is also called hot melt film adhesive, or heat sensitive type adhesive. Also, in order to increase its binding strength, the material is also known where an adhesive polymer material and a thermoplastic resin material are combined.

Regarding the thermoplastic resin materials that are used as thermally activated adhesive, there are many types, for example, it is possible to use polyester material. For example, in the reported in the description of the Japanese Patent Application Laid Open Number Showa 56-501131, thermally activated adhesive composition material with improved thermal resistance properties, has been disclosed. Namely, it is a adhesive composition material that contains (i) approximately 100 weight parts of a thermoplastic polymer material, (ii) a cross-adhesive (crosslinking agent), and (iii) approximately from 1 to 100 weight parts of an organic polymer material that has a complex number of functional radicals that can be used for the crosslinking reaction with the above described crosslinking agent. As the above described thermoplastic polymer material, it is possible to use polyester or polyurethane etc., and as the above described organic polymer material, it is possible to use polyalcohol type or polyamine type polymers, etc. Also, as the above described crosslinking agent, it is possible to use diisocyanate or polyisocyanates. In the case of such crosslinked thermally activated adhesive composition materials, it is possible to efficiently increase the thermal resistance properties. Also, in the case of such thermally activated adhesives, usually, they do not have adhesive properties at room temperature, and because of that it is also possible: to increase the ease of processing and positioning properties. However, in this disclosed adhesive composition material, an adhesive polymer is not contained and because of that it is difficult to increase the binding strength.

On the other hand, in the description reported according to the Japanese Patent Application Laid Open Number Hei-Sei 8-134428, a hot melt adhesive composition material is disclosed that contains a thermoplastic adhesive, and an adhesive polymer. In this patent report, as the thermoplastic adhesive polyester, and as the adhesive polymer material isooctyl acrylate—acrylic acid type copolymer material, are correspondingly given as the examples. In the case of this composition material also it is necessary that there is a phase separation of the adhesive polymer material and the thermoplastic adhesive. The reason for that is so that the coating properties of the hot melt adhesive agent at the time when it is coated in a liquid state, are increased, and also, so that the adhesive properties are maintained for a relatively long period of time (even when after cooling it is apparently solidified) after the coating technological process. Namely, in the case of this composition material, it is a material that is more appropriate to be used as a adhesive of the type that is liquefied and then used, than the material used as a film adhesive, where by heating the adhesive properties of the binding surface are increased.

In the descriptions reported according to the Japanese Patent Application Laid Open Number Hei-Sei 6-256746, Japanese Patent Application Laid Open Number Hei-Sei 5-339556, a thermally activated film adhesive has been disclosed that is formed from a composition material, where as the thermoplastic resin material a phenoxy resin, and then an epoxy resin, and their crosslinking agents are contained. In the case of the above described adhesive acrylic type polymer material, it is preferred that it is a material that contains in its molecule a carboxyl radical, a hydroxyl radical, or an epoxy radical.

Usually, the adhesives in the form of films that are usable in electrical type applications, are used so that after the punching, they are positioned and the electronic part etc., is bonded, and because of that it is good if the adhesive properties (the adhesive properties at room temperature, at approximately 25° C.) are as low as possible, and the materials that practically do not have adhesive properties are especially appropriate. Also, regarding the adhesives for electrical applications, there are many cases where thermal resistance properties are required and because of that usually, the pressure sensitive adhesive agents are not appropriate for these types of applications.

On the other hand, in the case of the combination of the usual adhesive polymer material and the thermoplastic resin material, the bonding surface of the film adhesive was not prevented from having adhesive properties. And in the case of film adhesive where the bonding surface has adhesive properties, it is not possible to solve the problems associated with the previously described adhesive film. Also, if an adhesive polymer material is not efficiently used it is difficult to increase the adhesive force.

Consequently, the goal of the present invention is to provide a thermally activated adhesive composition material whereby it is possible to form an adhesive in the form of a film where the surface practically does not possess pressure sensitive adhesive properties (in other words, it is "tack-free"), and the problems associated with the previously described adhesive film can be solved, and also, where it is easy to increase the bonding force.

The present invention, in order to solve the above described problems, provides a thermally activated adhesive composition material, characterized by the fact that it is a thermally activated adhesive composition material that is formed from an adhesive polymer, and a polyester, where the above described adhesive polymer material contains in its molecule hydroxyl and phenyl radicals or groups. The invention also provides adhesive films comprising said adhesive composition.

According to the thermally activated adhesive of the present invention, it has as its characteristic the fact. that the adhesive polymer that is used for compounding with the polyester material, is formed so that it contains in its molecule hydroxyl and phenyl radicals. In the case of such adhesive polymer material, the compatibility properties with the polyester are high, and it is a material where the adhesive properties of the adhesive composition material at room temperature, can be practically eliminated, and compared to the usual pressure sensitive adhesive, it has high thermal resistance properties. On the other hand, because at the time when it is heated, it shows high adhesive properties, it is a material whereby a thermal pressure adhesion operation, it is possible to have bonding of the materials subjected to the bonding, to each other, at a high adhesive strength.

Regarding the proportion of the above described polyester that is contained in the total of the adhesive composition material, usually, it is in the range of 5–50 weight %, and preferably, it is in the range of 10–45 weight %. If the amount of the polyester material is too small, it is not possible to practically eliminate the room temperature adhesive properties of the adhesive composition material, and on the contrary, if that contained amount is too large, there is the risk that a high adhesive strength immediately after the pressure adhesion is not obtained. On the other hand, regarding the proportion contained of the above described adhesive polymer material containing two functional radicals (a hydroxyl radical and a phenyl radical) in the total composition of the adhesive material, usually it is in the range of 50–95 or more weight %, and preferably, it is in the range of 55–89 weight %.

Regarding the above described polyester, as long as it is a material that at room temperature (approximately 25° C.) it is practically non-adhesive, and also, that has crystalline properties and can be melted upon heating, there are no particular limitations. However, polycaprolactone is preferred. The polycaprolactone is (i) a polyester that is obtained by the polymerization of caprolactone containing starting material, or (ii) it is a polyester where the polymer unit obtained by the caprolactone open ring polymerization (unit), is contained in the molecule. In the case of the composition material that contains the above described adhesive polymer and polycaprolactone, it is a material where because of the crystallization of the polycaprolactone, at room temperature it almost has no adhesive properties, however, by heating, the polycaprolactone is melted and strong bonding strength appears. Such effect is especially increased in the case when the adhesive polymer material that contains in its molecule at the same time a hydroxyl radical and a phenyl radical, is an acrylic type polymer material. This is because of the fact that the compatibility properties between such acrylic type polymer material and polycaprolactone, are especially excellent.

The thermally activated adhesive composition according to the present invention preferably contains a crosslinking agent. By that it is a material where the thermal resistance properties that are required from the adhesives used in electrical type applications, and especially, the solder resistance thermal properties, can be effectively increased.

The thermally activated adhesive composition material according to the present invention can be also used as a type of adhesive that is used as it is liquefied by heating, however, it is preferred that it is advantageously used as a film adhesive where the adhesive properties of the bonding surface are increased by heating. Namely, regarding the first practical implementation of the present invention, a film adhesive is suggested that is formed from the above described thermally activated adhesive composition material and that has the desired thickness. By using such film adhesive, it is possible that at room temperature the adhesive properties are practically eliminated, and compared to the usual pressure sensitive adhesive, it is a material that has high thermal resistance properties. On the other hand, at the time of the heating, it shows high adhesive properties and because of that it is a material whereby because of the high bonding force developed through a thermal and pressure adhesion operation the materials subject to the adhesion can be bonded to each other.

Regarding the adhesive polymer material used according to the present invention, as long as it is a polymer material, that shows adhesive properties at room temperature (approximately 25° C.), and that is formed so that it contains a polymer that has in its molecule a hydroxyl radical and a phenyl radical, there are no particular limitations. For example, it is possible to use acrylic type polymers, nitrile - butadiene type copolymer materials (NBR, etc.), styrene - butadiene type copolymers (SBR, etc.), polyurethanes, silicone type polymers, etc. Regarding the adhesive polymer material, it is possible to use one type of these polymer materials individually, and it is also possible that the structure is formed from a mixed material containing 2 or more types of these materials.

Regarding the polymer material that contains in its molecule the above described functional radicals, it is a material that is obtained by polymerization using as the starting monomers, raw materials that contain monomer possessing in its molecule a hydroxyl radical and monomers possessing in its molecule phenyl radical. Or, it is also a good option if after the polymerization, different functional radicals that are contained in the molecule (for example, carboxyl radicals) are reacted and they are changed to a hydroxyl radical and phenyl radical.

Here, one example of the preferred acrylic type polymer that can be used according to the present invention, will be described. It is a material where as the starting monomer material, the raw materials including (A) 1 or 2 and more phenoxy alkyl acrylates, (B) monomers containing in their molecule a hydroxyl radical, and depending on the requirements (C) (meth)acrylic acid alkyl ester, are copolymerized according to the usual methods like for example, emulsion polymerization, solution polymerization, agglomeration polymerization, suspension polymerization, etc., and the material is manufactured.

As the above described component (A), for example, phenoxy ethyl acrylate, phenoxy propyl acrylate, etc., can be used. Also, as the above described component (B), for example, 2-hydroxyethyl acrylate, 2-hydroxypropyl acrylate, 2-hydroxymethyl acrylate, 2-hydroxyethyl methacrylate, 2-hydroxypropyl methacrylate, hydroxy-3-phenoxypropylacrylate etc., can be used. Then, as the above described component (C), for example, it is possible to use n-butyl acrylate, isobutyl acrylate, isooctyl acrylate, 2-ethyl hexyl acrylate, etc.

As the above described component (B), hydroxy-3-phenoxypropyl acrylate etc., materials are preferred, that are monomers where in the molecule both a hydroxyl radical and a phenyl radical, are contained. By that, it is possible to especially efficiently increase the compatibility properties of the adhesive polymer material relative to the polyester material.

Regarding the proportion (weight ratio) of the monomer unit, that contains the above described two functional radicals, contained in the polymer units of the total material of the adhesive polymer (namely, total monomer units derived from the component (A) and component (B)) usually it is 70 weight % and above, preferably it is 80 weight % and above, and especially preferably, it is 90 weight % and above. If the amount contained of the above described monomer units containing the two functional radicals is too low, there is the risk that the compatibility properties relative to the polyester material are also decreased. Also, regarding the proportion of monomer units derived from the component (B), that is contained in the polymer units of the total polymer material, it is 0.5 mole % and above, preferably, it is 1 mole % and above, and especially preferably, it is in the range of 5–15 mole %. If the amount contained of the monomers derived from the component (B) is too low, there is the risk that it would be ineffective in the generation of sufficiently high adhesive force (for example, 0.5 kg/cm and above) immediately after the pressure adhesion. And if the amount contained of the units derived from the component (B) is too high, there is the risk that the compatibility properties relative to the polyester material would be decreased.

Regarding the adhesive polymer material that is used according to the present invention, as long as the results from the present invention are not hindered, in addition to the above described polymer material containing the two functional radicals (the hydroxyl radical and the phenyl radical), it is also possible that polymer material that does not contain the above described two functional radicals, is also contained. However, the proportion in the total adhesive polymer material, of the above described two functional radicals (hydroxyl radical and phenyl radical) containing polymer is usually 70 weight % and above, preferably, it is 80 weight % and higher, and especially preferably, it is 90 weight % and higher.

Also, regarding the molecular weight of the adhesive polymer material, it is good as long as it is within the range where the desired adhesive strength is generated, and usually, the weight average molecular weight is in the range of 10,000–100,000. Also, the same way as in the case of the pressure sensitive adhesive according to the previous technology, together with the adhesive polymer material, it is also possible to use an adhesion imparting agent. Also, as long as it is within the range where the results from the present invention are not hindered, it is also a good option if the above described adhesive polymer is a material that is crosslinkable by using heat or a radiation beam (ultra-violet beam, electron beam, etc.). The crosslinking of the adhesive polymer material can be done as a crosslinking prior to or after the bonding to the material that is the subject of the adhesion.

On the other hand, regarding the molecular weight of the polyester material, it is a good option as long as it is within the range where the predetermined adhesive strength is generated, and also, as long as the composition material practically does not have adhesive properties at room temperature. And expressed as a weight average molecular weight, it is usually in the range of 500–200,000, and preferably, it is within the range of 1,000–100,000. In the case when the molecular weight is too low, there is the danger that the adhesive force would be decreased, and on the contrary, in the case when it is too high, the compatibility properties relative to the adhesive polymer material are decreased, and there is the danger that the elimination of the adhesive properties of the composition material at room temperature would become difficult.

Regarding the thermally activated adhesive composition material according to the present invention, it can be manufactured as through the usual mixing operations, all the raw materials are homogeneously mixed and combined. For example, adhesive polymer material, polyester, solvent agent, crosslinking agent added depending on the requirements, etc., additives, are mixed and combined by using a mixing equipment like a Homomixer, a planetary mixer, etc., and each of the materials is homogeneously dissolved or dispersed, and by that it is possible to prepare the liquid state composition material.

Regarding this liquid state composition material, usually, it can be prepared as the first solution where the above described adhesive polymer material is liquefied, and the second solution where the above described crystalline polymer is liquefied, are mixed and combined, and the above described adhesive polymer material and it is prepared as the above precursor solution where the above described crystalline polymer material, are homogeneously liquefied, and then this precursor solution is dried, and then the thermally activated adhesive composition material is formed from the dried material obtained from this precursor solution. If this is done, it is possible to form a specific morphology from the crystalline polycaprolactone and the adhesive polymer material that contains a hydroxyl radical and a phenyl radical (mutually continuous structure) and it is possible to especially efficiently demonstrate the above described properties (non-adhesive properties at room temperature and high adhesive strength). Moreover, in the case when a crosslinking agent is added, usually, a third solution containing the crosslinking agent is added to the above described precursor liquid material.

The liquid composition material that has been manufactured according to the above described is coated on the substrate material and dried, and by that the film adhesive from the above described adhesive composition material, can be formed. As the coating measures, it is possible to use a knife coater, a roll coater, a die coater a bar coater, etc., well known measures. As the above described substrate material, it is possible to use a material that is a release material, like a liner etc., and it is possible to use the material that must be bonded, or an adhesive sheet supporting material etc. In the case when a material that has release properties, like a liner etc., is used, it is possible to obtain a material where the film adhesive agent that is formed from the adhesive composition material, is easily and simply removed.

Also, regarding the drying at the time of the formation of the film adhesive, usually, it is conducted at a temperature in the range of 60–180° C. And the drying period is usually in the range from several tens of seconds to several minutes. Regarding the thickness of the. film adhesive, it is in the range of 10–1,000 micrometers, and preferably, it is in the range of 20–500 micrometers, and especially preferably, it is in the range of 50–100 micrometers.

The film adhesive according to the present invention can also be used as the adhesive layer of an adhesive (bonding) sheet. Namely, in the case of the present invention an adhesive sheet is suggested, that has a supporting material and an adhesive layer that is formed from a thermally activated adhesive composition material that is fixed on one of the main surfaces of its supporting material. There are no particular limitations regarding the above described supporting material, however, usually, the materials used as the base films in the adhesive sheets according to the previous technology, are used, and such materials that have flexible properties can be used. For example, it is possible to use paper, metal films, plastic films etc. As the plastic films, it is possible to use polyimide, polyvinyl chloride, acrylic type polymers, fluorinated type polymers, polyester (PET etc.), polyurethane etc., synthetic polymer materials.

Regarding the supporting material, it is a good option if it is a material that is visible light and ultra-violet light permeable, and it is also a good option if it is a material that is colored or that is decorated by printing etc.

Also, it is a good option if it is a material where in order to impart an appearance with metal gloss type of properties, it has been provided with a metal vapor deposited layer. Then, in order to impart optical capability to the bonding sheet, it is also possible to use a light polarization film, a dielectric reflective film, a recurrent reflection film, a prism film, a fluorescent light film, a film type electroluminescence element etc., as the supporting materials. On the other hand, in order to increase the soiling resistance properties of the front surface of the supporting material, it is also possible to form an optical catalyst layer on the front surface of the supporting material. Also, it is a good option if the supporting material has a structure that is formed from tow or more different types of layers. Regarding the thickness of the supporting material, usually, it is in the range of 5–500 micrometers, and preferably, it is in the range of 10–300 micrometers. If the thickness is too low, the mechanical strength of the bonding sheet is decreased, and there is the danger that the durability properties would be decreased. And on the contrary, if the thickness is too high, the flexibility properties and the elastic properties of the whole body of the bonding sheet are decreased, and there is the risk that the gluing operation would become difficult.

On the surface of the side of the supporting material where the bonding layer is to be formed it is also possible that a primer layer is provided. Usually, the primer is prepared as a solution that contains the material that forms the primer is prepared, and then this is coated on one of the main surfaces of the supporting material and the primer layer is formed.

The bonding surface of the adhesive is usually protected by a liner. This liner is usually formed from paper, plastic film, or a film that is formed as those two layers are laminated as laminated layers.

Also, in the adhesive composition according to the present invention, as long as it is within the range where the result from the present invention is not hindered, it is possible to add additive agents that are well known from the previous technology. For example, there are the following: viscosity regulating agents, leveling agents, ultra-violet light absorbing agents, anti-oxidation agents, fungus resistant agents, glass beads, etc., fine, microscopic particles, elastic fine microscopic spheres that are formed from adhesive polymer material or from non-adhesive rubber type polymer material, etc.

As it has been described here above, for the adhesive composition material according to the present invention it is preferred that it contains a crosslinking agent. The crosslinking agent is a material that can increase the thermal resistance properties of the adhesive agent composition material. As the crosslinking agents, for example, it is possible to use isocyanate compounds, melanin compounds, epoxy compounds, poly (meth)acrylate compounds, etc. regarding the proportion of the crosslinking agent that is contained in the total material of the adhesive composition, usually, it is 20 weight % or less, preferably, it is in the range of 0.2–10 weight %, and especially preferably, it is in the range of 0.5–5 weight %. If the amount of the crosslinking agent is too small, there is the risk that it would not be possible to increase the thermal resistance properties, and on the contrary, if the amount of the crosslinking agent is too high, there is the risk that the adhesive strength would be decreased.

Moreover, it is possible that the adhesive composition material is activated before or/and after it is bonded to the material that is the subject of the binding. However, in the case when the adhesive composition material is crosslinked prior to its appropriate use on the material subject to the bonding, the adhesive composition material should of such type that it demonstrates sufficient thermal adhesion properties upon heating. Also, regarding the crosslinking of the adhesive composition material, usually, it is conducted as the adhesive polymer material is crosslinked.

EXAMPLE 1

First, an ethyl acetate solution containing an adhesive polymer material (concentration of the non-volatile part =30 weight %), and a toluene solution containing polycaprolactone (concentration of the non-volatile part =30 weight %) are mixed, and the precursor solution was formed. This precursor solution is coated on the surface of release type film (PET film) and dried, so that on the surface of the release film material a film of adhesive is formed with a thickness of 60 micrometers. In Table 1 the composition of the film adhesive is shown. Moreover, according to Examples 5–8, in the above described precursor solution the predetermined amount of an isocyanate type crosslinking agent is added, and the solution obtained after the addition is coated, and dried and a film adhesive was formed.

For the film adhesives obtained according to all the practical examples, it was confirmed that they do not have adhesive properties at 25° C. (by the finger—tack test). Also, the film adhesives according to all the practical examples, were capable of thermal activation at 120° C.

Moreover, regarding the adhesive polymers according to each practical example, the starting monomer material, formed from a monomer where in the molecule a phenoxy radical is contained (phenoxy ethyl acrylate, "BISCOAT #192", manufactured by Osaka Organic Chemistry Industries Company), and a monomer that contains in its molecule a phenoxy radical and a hydroxyl radical (2-hydroxy-3-phenoxy propyl acrylate, "ARONIX M-5700", manufactured by Toatsu Gosei Chemical Industries Company), was solution polymerized in an ethyl acetate solvent medium, and by that the material was prepared. Also, for each practical example, regarding the contained amount of the monomer that contains in its molecule a phenoxy radical and a hydroxyl radical (M5700), was as it is shown here below.

Comparative Example 1

On the other hand, besides the fact that as the adhesive polymer material a material was used that did not contain in its molecule at the same time a phenoxy radical and a hydroxyl radical, the technological procedures of Example 1 were followed, and the film adhesive according to Comparative Example 1, was formed. The composition of the film adhesive is shown in Table 1. The film bonding composition according to Comparative Example 1 showed adhesive properties at a temperature of 25° C. (according to the finger tack test).

TABLE 1

Composition Table

| | |
|---|---|
| Example 1 | PS1/PCL = 70/30 |
| Example 2 | PS2/PCL = 70/30 |
| Example 3 | PS2/PCL = 85/15 |
| Example 4 | PS2/PCL = 55/45 |
| Example 5 | PS2/PCL/L45 = 70/30/0.7 |
| Example 6 | PS2/PCL/L45 = 70/30/1.5 |
| Example 7 | PS2/PCL/L45 = 70/30/2.3 |
| Example 8 | PS2/PCL/LA5 = 70/30/4.5 |
| Example 9 | PS3/PCL = 70/30 |
| Example 10 | PS4/PCL = 70/30 |
| Comparative Example 1 | PS5/PCL = 70/30 |

The above described parts in all cases represent parts by weight.
PCL: polycaprolactone, manufactured by Daicell Chemical Company "PURAKUCELL H7"; molecular weight = 70,000
PS1: #192: M5700 = 95:5 (mole ratio)
PS2: #192: M5700 = 90:10 (mole ratio)
PS3: #192: M5700 = 99:1 (mole ratio)
PS4: #192: M5700 = 97:3 (mole ratio)
PS5: 2-ethyl hexyl acrylate: acrylic acid = 90:10 (weight ratio)
L45: isocyanate type crosslinking agent ("CORONATE", manufactured by Nippon Polyurethane Company)

In the space between 2 polyimide films with a thickness of 25 micrometers, the film adhesives according to each of the samples presented in Table 2, were inserted and placed, and it was pressure adhered at a temperature of 120° C., at a pressure of 5 kg/cm2, for a period of 1 minute, and the bonding strength after the adhesion was evaluated. The results are shown in Table 2. Moreover, the bonding force was measured as the peel strength that occurs at a separation speed of 50 mmnnminute, in a 180 degree peel test.

TABLE 2

Adhesive Strength (after the pressure adhesion)

| | #192/M5700 [kg/cm] | Adhesive Strength |
|---|---|---|
| Example 1 | 95/5 | 0.55 |
| Example 2 | 90/10 | 0.57 |
| Example 9 | 99/1 | 0.21 |

TABLE 2-continued

Adhesive Strength (after the pressure adhesion)

| | #192/M5700 [kg/cm] | Adhesive Strength |
|---|---|---|
| Example 10 | 97/3 | 0.43 |
| Comparative Example 1 | — | >0.1 |

Also, from these results, it was understood that in order to obtain a bonding strength that is 0.5 kg/cm or higher, after the pressure adhesion, it is appropriate that the contained amount of the monomer unit that contains a phenyl radical and a hydroxyl radical, in the adhesive polymer material, is 5 mole % or higher.

On the other hand, in the space between a 2 mm thick polyether imide plate and a 25 micron thick polyimide film, the film adhesives according to each of the examples shown in Table 3, are inserted and placed, and then a pressure adhesion was conducted at a temperature of 120° C., pressure of 5 kg/cm2, for a period of 1 minute, and after that, a heating was conducted at a temperature of 150° C. for a period of 30 minutes (aging or post-cure) and the materials that have undergone that were evaluated for their bonding strength. The results are shown in Table 3. Also, the presence or absence of air bubbles at the time when on the adhesive films according to each of the examples, solder material at a temperature of 260° C. was placed for 1 minute, was monitored. The cases where there were no air bubbles were evaluated as "pass". The same way, the results are shown according to the presented in Table 3.

TABLE 3

Adhesive Strength (after pressure adhesion, post cure) and solder resistant thermal properties (260° C./1 minute).

| | Adhesive Strength [kg/cm] | Solder Resistant Thermal Properties | Crosslinking Agent weight parts |
|---|---|---|---|
| Example 2 | 2.0 | there are air bubbles | 0 |
| Example 3 | 1.3 | there are air bubbles | 0 |
| Example 4 | 2.0 | there are air bubbles | 0 |
| Example 5 | 2.2 | pass | 0.7 |
| Example 6 | 2.7 | pass | 1.5 |
| Example 7 | 1.8 | pass | 2.3 |
| Example 8 | 1.6 | pass | 4.5 |

From these results, it was understood that in order to practically demonstrate especially good solder resistant thermal properties (thermal resistance properties test under conditions that are said to be severe, 260° C./1 minute), it is appropriate to add a crosslinking agent.

To suggest a thermally activated adhesive whereby it is possible to form a adhesive film whose surface practically does nbt have adhesive properties.
Solution measures A thermally activated adhesive composition material, characterized by the fact that it is a thermally activated adhesive composition material that is formed from an adhesive polymer and a polyester, where the above described adhesive polymer material is formed so that it contains a polymer that has a hydroxyl radical and a phenyl radical in its molecule.

What is claimed is:
1. A thermally activated adhesive composition comprising adhesive polymer and polyester, wherein the adhesive polymer comprises a polymer polymerised from (A) phenoxy alkyl acrylate; (B) hydroxy-phenoxy alkyl acrylate; and optionally (C) (meth)acrylic acid alkyl ester.

2. The thermally activated adhesive composition according to claim 1, wherein the polyester is polycaprolactone.

3. An adhesive in the form of a film comprising the thermally activated adhesive composition according to claim 1.

* * * * *

UNITED STATES PATENT AND TRADEMARK OFFICE
CERTIFICATE OF CORRECTION

PATENT NO. : 6,753,379 B1
DATED : June 22, 2004
INVENTOR(S) : Kawate, Kohichiro

It is certified that error appears in the above-identified patent and that said Letters Patent is hereby corrected as shown below:

Title page,
Item [57], ABSTRACT,
Line 2, insert -- adhesive -- after "comprising" and insert -- , -- after "polyester".

Column 2,
Line 29, delete ":" after "possible".

Column 3,
Line 36, delete "." after "fact".

Column 7,
Line 16, delete "." before "film".

Column 9,
Line 58, delete "mmnnminute" and insert in place thereof -- mm/minute --.

Column 10,
Line 55, delete "nbt" and insert in place thereof -- not --.

Signed and Sealed this

Nineteenth Day of April, 2005

JON W. DUDAS
*Director of the United States Patent and Trademark Office*